(12) United States Patent
Hiscock et al.

(10) Patent No.: US 6,195,351 B1
(45) Date of Patent: Feb. 27, 2001

(54) LOGICAL SWITCH SET

(75) Inventors: James Scott Hiscock, Rockport; Joris Johannes Maria Wils, Acton; Stephen Luke Van Seters, Stow, all of MA (US); Edward A. Heiner, Jr., Londonderry, NH (US); G. Stodel Friedman, Acton; John Joseph Harrison, Jr., Grafton, both of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/014,548

(22) Filed: Jan. 28, 1998

(51) Int. Cl.[7] .................................................. H04L 12/28
(52) U.S. Cl. ........................ 370/389; 370/254; 370/406
(58) Field of Search .................................. 370/216, 217, 370/218, 219, 220, 221, 222, 225, 226, 227, 228, 254, 255, 256, 251, 252, 400, 401, 402, 235, 396, 397, 392, 399, 431, 433, 406, 389; 709/220, 221, 222, 223, 224, 225, 226, 105; 714/1–5

(56) References Cited

U.S. PATENT DOCUMENTS

| | | | |
|---|---|---|---|
| 5,473,599 | * 12/1995 | Li et al. ............................... | 370/219 |
| 5,617,421 | * 4/1997 | Chin et al. ........................... | 370/402 |
| 5,761,435 | * 6/1998 | Fukuda et al. . | |
| 5,825,772 | * 10/1998 | Dobbins et al. ..................... | 370/396 |
| 5,859,959 | * 1/1999 | Kimball et al. ................. | 395/182.02 |
| 5,949,788 | * 9/1999 | Friedman et al. ................... | 370/431 |
| 5,953,314 | * 9/1999 | Ganmukhi et al. ................. | 370/220 |
| 5,959,968 | * 9/1999 | Chin et al. ........................... | 370/216 |
| 6,016,310 | * 1/2000 | Muller et al. ........................ | 370/255 |
| 6,032,194 | * 2/2000 | Gai et al. ............................. | 370/217 |
| 6,041,057 | * 3/2000 | Stone ................................... | 370/397 |
| 6,049,528 | * 4/2000 | Hendel et al. ....................... | 370/235 |

FOREIGN PATENT DOCUMENTS

WO 95/29544 * 11/1995 (WO) .
WO 99/00937 * 1/1999 (WO) .

* cited by examiner

*Primary Examiner*—Wellington Chin
*Assistant Examiner*—Steven Nguyen
(74) *Attorney, Agent, or Firm*—McGlew and Tuttle, P.C.

(57) ABSTRACT

A Logical Switch Set (LSS) is provided comprising two or more switches that act as a single packet forwarding device with specific connection rules. The single packet forwarding device is a single logical unit. The LSS may be used as either a redundant switch set (RSS) or as a Load Sharing Switch Set (LSSS). The maximum throughput of the LSSS increases with each additional switch. A LSSS can only interconnect with the other devices via trunked links that contain at least one physical connection to each switch. The RSS may include a trunk link connection and a resilient link connection

7 Claims, 7 Drawing Sheets

LOGICAL SWITCH SET

FIELD OF THE INVENTION

The invention relates generally to network systems and more particularly to techniques and device models to provide high availability interface systems including link and switch redundancy.

BACKGROUND OF THE INVENTION

Traditionally spanning tree (a spanning tree protocol) has been use to provide both Layer 1 and 2 redundancy, in switch networks, by configuring alternate paths. When a link or switch element fails, a backup link is activated. The spanning tree algorithm defines the active and backup links in the topology. Spanning tree is designed to control the many switches of the topology and has a slow (in the tens of seconds) reconfiguration time.

Spanning tree has a significant disadvantage as to the reconfiguration time. As network systems become more complex and handle additional traffic, the reconfiguration time becomes increasingly problematic.

SUMMARY AND OBJECTS OF THE INVENTION

It is an object of the invention to provide layer one and layer two redundancy and switch network systems which avoid the use of Spanning Tree by the use of multiple switches forming a single logical switch that can participate in topology control protocols (e.g. Spanning Tree and GARP) for each VLAN (virtual LAN), unicast and multicast and can share MAC address learning information. The invention provides two or more switches which combine to provide a single packet forwarding device.

According to the invention a Logical Switch Set (LSS) is provided comprising two or more switches that act as a single packet forwarding device with specific connection rules. The LSS may be used as either a redundant switch set (RSS) or as a Load Sharing Switch Set (LSSS). The maximum throughput of the LSSS increases with each additional switch. A LSSS can only interconnect with the other devices via trunked links that contain at least one physical connection to each switch (A through N). This prevents any single link attachments to the LSSS. This also implies that if a link is lost, leaving no remaining links to that switch, then LSSS can either chose to drop service to that station or stop using that switch for load sharing for all connected devices. Effectively removing that switch from LSSS.

The LSS implements a single logical device which is comprised of two or more separate switches. This logical device can operate as a simple packet forwarding device, a full function fully manageable switch, or any variation between these extremes. The simplest non filtering packet forwarding device need not share any state information between devices. A full function fully manageable switch model requires that state or parameter changes, acquired from the traffic streams a switch receives, be shared between the other switches. State and parameter changes can occur from learning MAC source addresses and processing management and control frames. Management and control frames destined for the logical device will be directed to one of the switches by the traffic steering algorithm of an attached device. Each switch in the LSS implements one or more of the physical links, within a trunked group, for each the ports of the logical device. Each switch must have a unified view of the logical switch and port parameters to properly forward traffic and to transmit management and control frames. This sharing of state information requires a communication path between switches in a LSS. This communication path may be a dedicated resource.

A LSS may be implemented either as a primary/backup pair (or group) or as a load sharing set. The primary/backup method uses one device to perform the traffic forwarding and management functions while the other device maintains up to date state information from the primary device, ready to take over if the primary device fails or is removed. The load sharing switch set method spreads the load of traffic forwarding and management across all the switches in the set.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
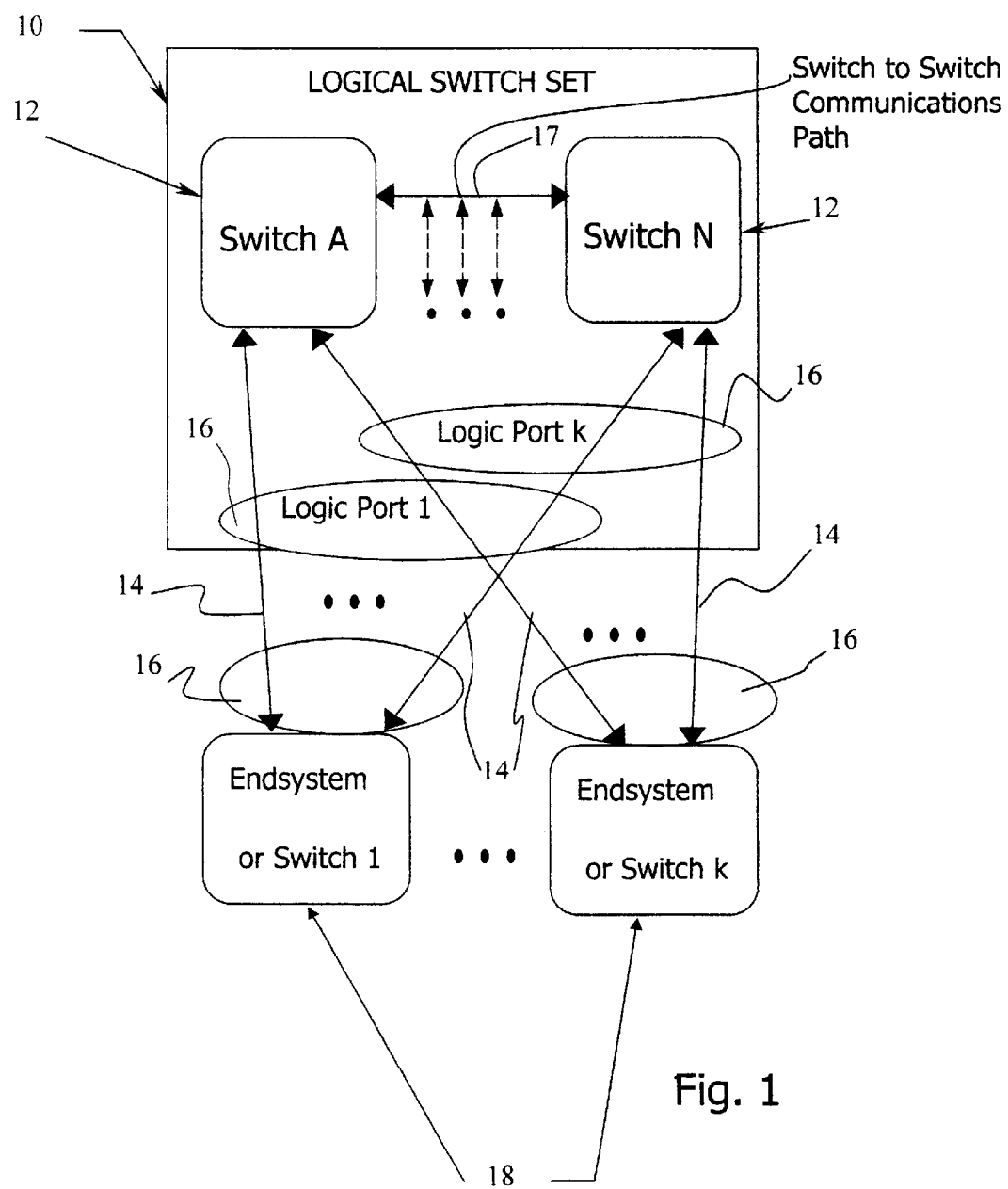
FIG. 1 is a schematic diagram showing the general scheme of the logical switch set according to the invention.

Referring to the drawings in particular, the invention comprises a Logical Switch Set (LSS) generally designated 10 in FIG. 1. The LSS comprises two or more switches 12 that act as a single packet forwarding device with specific connection rules. The LSS may either be a Redundant Switch Set (RSS) providing a primary/backup Switch Pair (RSS) 20 (shown in FIG. 2A) or a Load Sharing Switch Set (LSSS) 50 (shown in FIG. 5). For the LSSS 50 the maximum throughput of this device increases with each additional switch N. The behavior and connection rules are described below.

The LSS 10 implements a single logical device 46 which is comprised of two or more separate switches 12. This logical device or the LSS 10 has a single logical port for each edge device, e.g. endsystem 18 or switch 18. The endsystem or switch 18 is connected by links 14. The LSS 10 can operate as a simple packet forwarding device, a full function fully manageable switch, or anywhere in between. The simplest non filtering packet forwarding device need not share any state information between devices. A full function fully manageable switch model requires that state or parameter changes, acquired from the traffic streams a switch receives, be shared between the other switches. State and parameter changes can occur from learning MAC source addresses and processing management and control frames. Management and control frames destined for the logical device will be directed to one of the switches by the traffic steering algorithm of an attached device. Each switch in the LSS implements one or more of the physical links, within a trunked group, for each of the logical ports 16 of the logical device. Each switch 12 must have a unified view of the logical switch and port parameters to properly forward traffic and to transmit management and control frames. This sharing of state information requires a communication path 15 between switches in the LSS 10. This communication path could be a dedicated resource or travel in band.

A LSS 50 (shown in FIG. 5) can only interconnect with the other devices via trunked links namely links that contain at least one physical connection link 14 to each switch (A through N) in the LSSS. This prevents any single link attachments to the LSSS. This also implies that if a link is lost, leaving no remaining links to that switch, then LSSS can either chose to drop service to that station or stop using that switch as a primary or backup or for load sharing for all connected devices. Effectively removing that switch from LSSS.

Active and Hot Standby (Primary/Backup) Redundant Switch Set

Figure 2A:
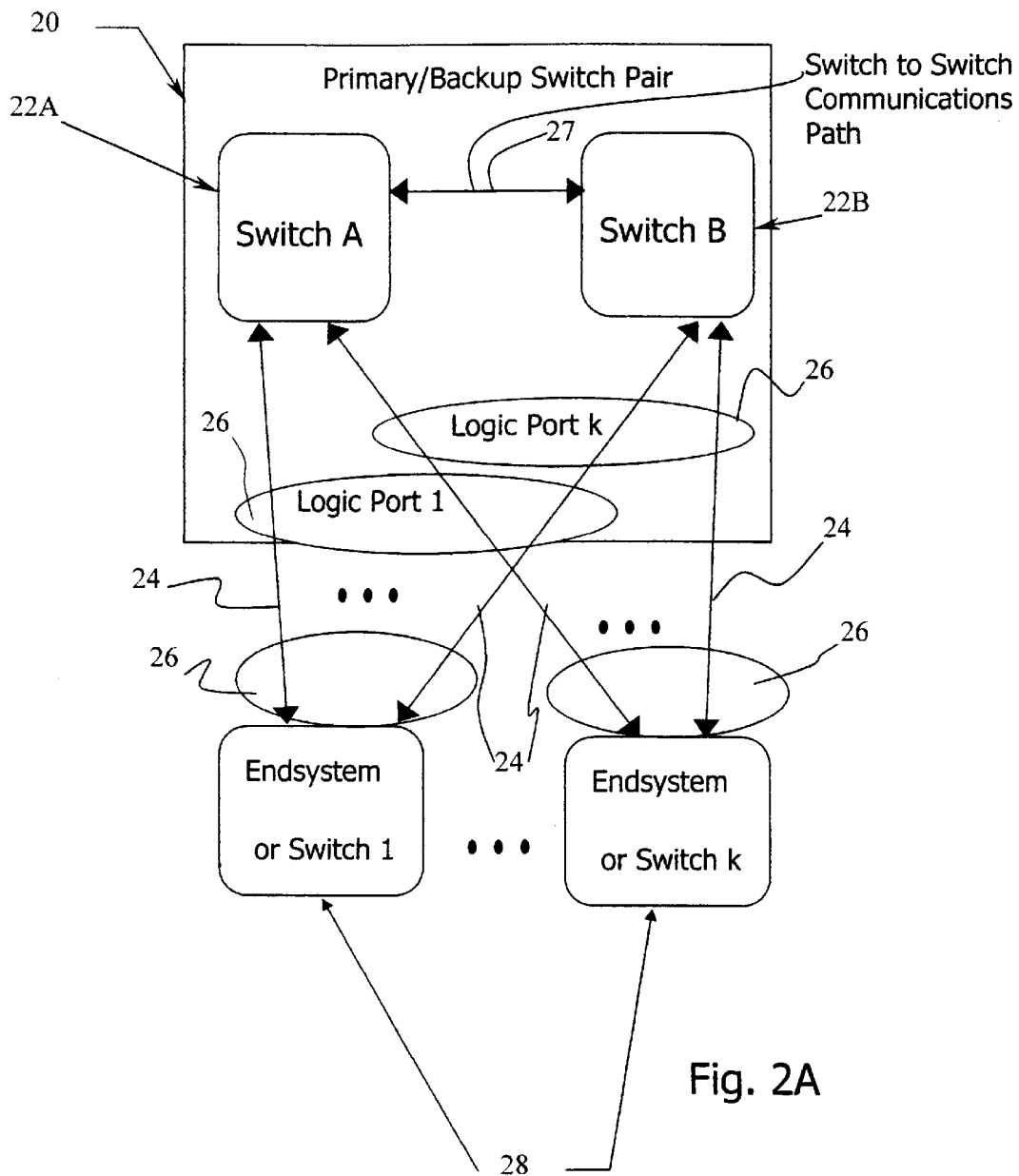
FIG. 2A is a view similar to FIG. 1 showing the implementation of the redundant switch set as a primary/backup pair.

A Redundant Switch Set (RSS) implementation is shown in FIG. 2A. The (RSS) 20 comprises a pair of tightly coupled switches 22 that act as one logical device. One logical port 26 for each endsystem or switch 28 which is connected by links 24 is provided. One switch assumes the role of the primary switch, providing the LAN interconnection and management while the other switch, called the backup switch, stands by ready to take over, in the event of a failure on the primary switch.

The (RSS) 20 can interconnect with the other devices 28 either via resilient or trunked links 14 that contain at least one physical connection to both switches. Resilient links provide a backup path at the physical layer. Only one link 24 of resilient links is active at a time, therefore no load sharing is possible. Resilient links can be used in a dual homed configuration to provide a backup path at the physical layer. Dual or multi homed link redundancy provides two or more links connected between the endsystem or switch and two different switches to guard against link failure and the possibility of switch failure. Only one link is active at a time, therefore only one of the two switches is supplying traffic to the dual homed station or switch. Implementation techniques vary with network technology. Implementations are available for Ethernet, Fast Ethernet, FDDI, Token Ring, and ATM (Asynchronous Transfer Mode).

Trunked links consist of multiple layer 2 paths that act as a single logical port and can be used to load share the traffic or only provide alternative layer 2 (MAC layer) paths, or a combination of both. TCMP (Trunk Configuration Management Protocol) can be used to automatically configure and re-configure in the event of a link or switch failure. Trunking can be used to connect to a load sharing switch set, or a primary/backup redundant switch pair, in a dual homed configuration. Trunking is data link technology independent and is available on Fast Ethernet and Gigabit links.

The requirement that at least one physical connection is provided to both (all) switches, prevents any single link attachments to the (RSS) 20. If a link is lost leaving no remaining links to the switch then the (RSS) 20 can either choose to drop service to that station or have the Backup switch take over as the primary switch for all connected devices. This switch over should only take place if the Backup switch has a superset of operating ports.

If a trunking is used to interconnect a (RSS) 20 with other devices 28 then the backup switch does not send any trunking configuration management protocol (TCMP) messages. This will prevent the attached device from using the physical link(s) connected to the backup switch. When the backup switch takes over for the Primary switch then it will start issuing TCMP messages and the old primary switch stops. This will cause the connected device to only use the physical link attached to the Active switch module.

Resilient Links can be used to interconnect a (RSS) 20 with other devices since no load sharing is provided with (RSS) configuration 20. The connected device 28 can either use link status or other out of band information to determine which physical link should be active and which should be standby. If link status is used then only the primary switch module can indicate good link status. This is more difficult and error prone than using out of band information. For example, the Active links may be indicated using out of band signals called switch select lines 27. Redundant star wired backplane links may be configured to send traffic from the I/O (input/output) modules or external devices/switches 28 to the central redundant switch set fabric of the PBSP LSS (RSS) 20 on both the active and backup links. The I/O modules use switch select lines 27 to determine which link to source the receive traffic.

Figure 2B:
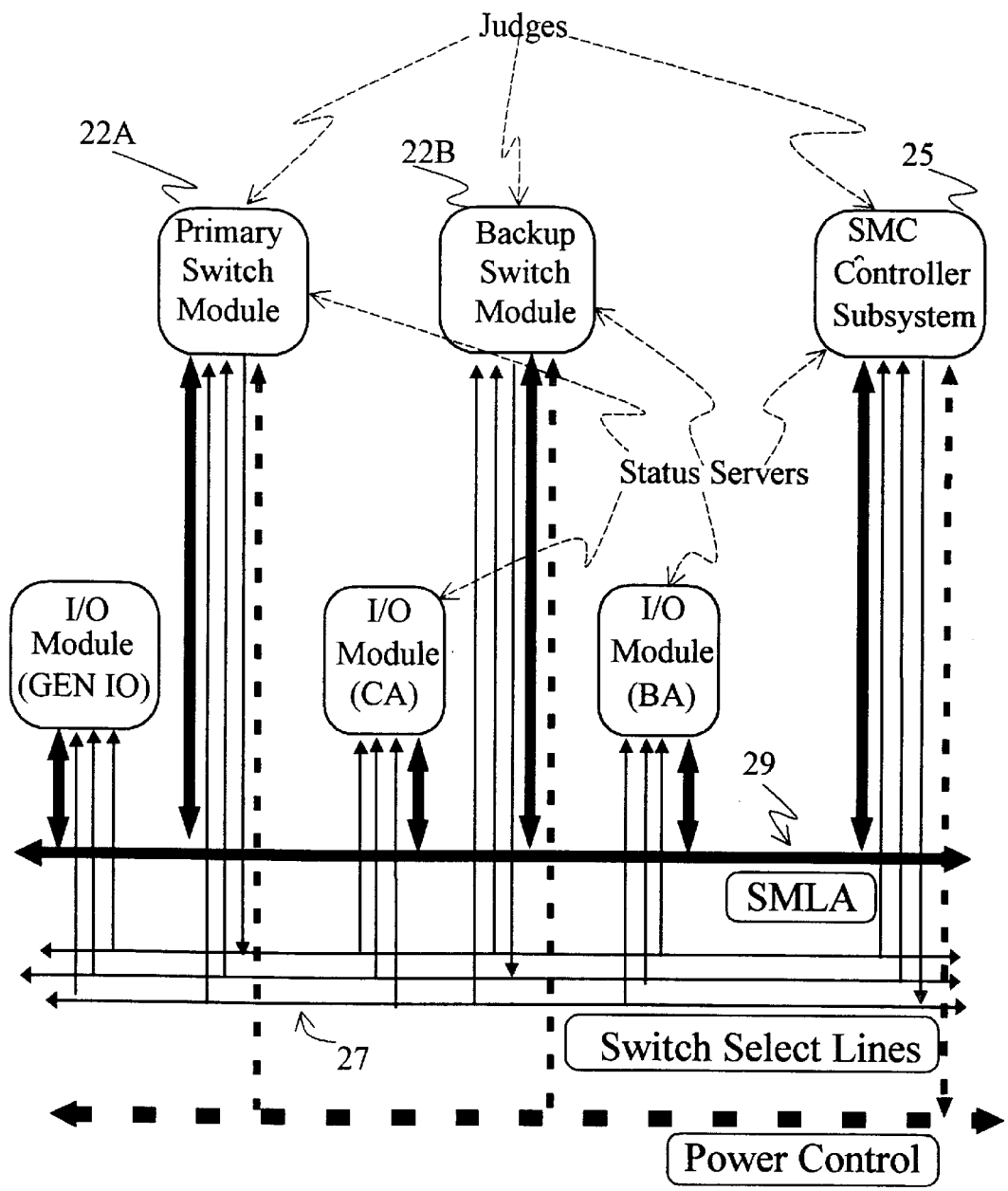
FIG. 2B is a schematic view showing the Logical switch set of FIG. 2A as a primary/backup pair implemented with a controller for primary switch selection.

The out of band signals may be signals from two types of components, judges and status servers. The judges discover and coordinate servers to gather switch fabric status. The status servers register, implicitly or explicitly, the ability to test the packet switch fabric and report the results on SMLAN (switch management local area network) 29. An example is shown in FIG. 2B where there are three judges in the packet switch fabric redundancy system, the two switch modules 22A and 22B, and an SMC 25 (Switch Management Controller). The three judges gather information about the packet switch fabric status and each express their belief as to which switch module should be active. The I/O Modules receive the active switch judgments, from all three judges via the Switch Select Lines 27, and determine from which switch module to receive traffic based on the voting of the three judges. This provides a voting system for an effective switch selection.

Figure 3:
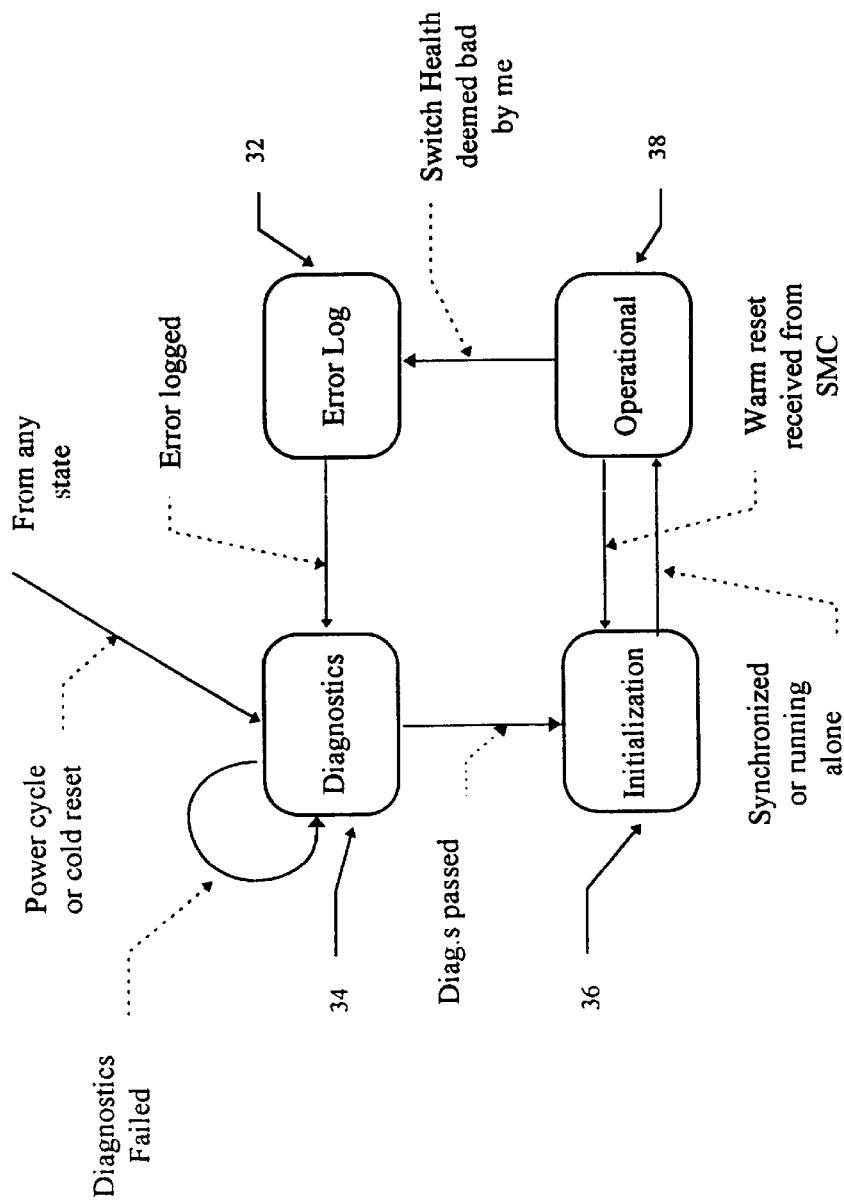
FIG. 3 is a state diagram showing four major states of a switch of a redundant switch set.

FIG. 3 is a state diagram 30 which shows the four major states of a switch module 22. When a switch module 22 powers up it runs diagnostics. If the diagnostics detects a fatal error then the module stays in the diagnostic state 34 displaying an error, otherwise the module enters the Initialization state 36.

Initialization operations include, verifying that the NV data is valid for this chassis, and synchronization of the parameters between the modules.

When a warm reset message is sent by the SMC 25 over the SMLAN 29, the switch will transition for the operational state 38 back to the initialization state 36. The switch will transition from the operational state 38 to the error log state 32 if the switch determines it is not operating in a healthy manner. The switch transitions from the error log state 32 to the diagnostic state 34 when the error has been logged.

In the normal operational state one switch module 22 acts as the active (primary) switch module and the other module, if present, operational, and functionally compatible with the primary switch module, acts as a hot standby (backup). The active switch module runs in the primary state 42. The hot standby module runs in the backup state 44. The primary switch module keeps the backup module current with the latest operational values that result from processing management protocols such as SNMP.

Figure 4:
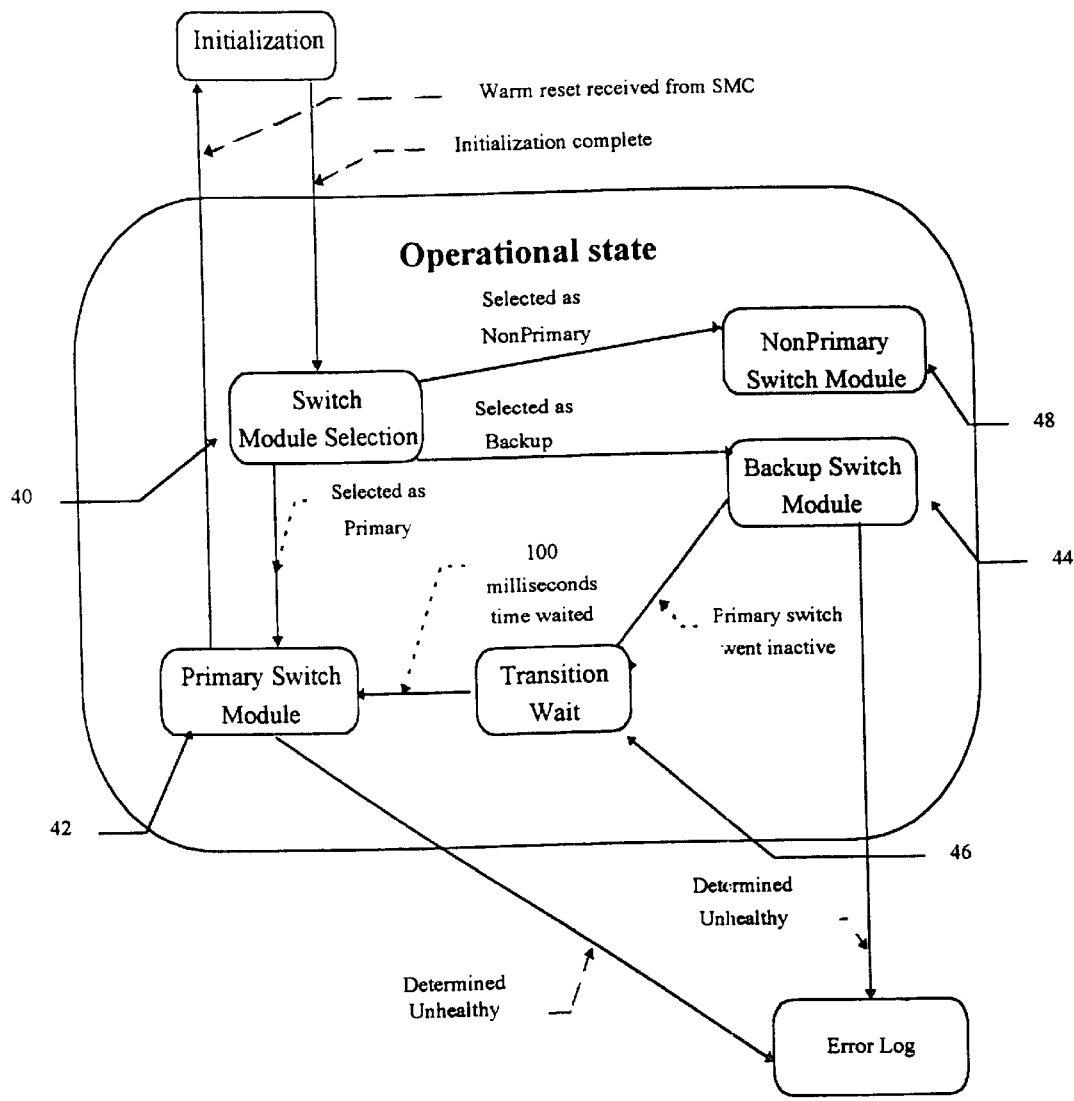
FIG. 4 is a state diagram showing the sub states of a switch which is operational.

FIG. 4 shows the substates of a switch 22A and/or 22B that is operational. In addition to the primary and backup switch module states, a switch module may be in a non-primary state 46. This state is entered when a primary switch module is present, and the second switch module is not capable of configuring itself as a hot standby due to a configuration incompatibility, either hardware or software, with the primary switch module. The non-primary state is saved in non-volatile storage until it is either cleared manually, or until the incompatible condition no longer exists.

In the non-Primary state, a module monitors the redundancy protocol messages, waiting to determine whether or not the incompatibility has been resolved. No data synchronization is maintained between the primary and the non-primary switch module.

For selection, the two switch modules 22A 22B and the SMC (Switch Management Controller) 25 all act as judges. The Switch Modules role as judge has three main components, status server configuration, status collection, and judgment conveyance. Status is collected with a query to the status servers. The judgment is made with information collected from the responses. Finally the judgment is conveyed to the I/O modules via the Switch Select Lines on the backplane.

In the operational state, the switch may enter sub states as described below with reference to FIG. 4.

The switch module selection state 40 is entered upon switch module initialization to determine the initial operational state of the fabric module. The selection algorithm is based on a number of criteria, including slot number (physical location), fabric compatibility, and non-primary non-volatile settings. Pseudo code for this state is given below as a example and not as a implementation requirement.

Switch Module Selection state pseudo code
Begin
   Set timerA (100 milliseconds ) to transmit next Parameter Update and/or Fabric status query message to the other switch
   Set timerB (300 milliseconds ) to time out waiting for a message
   If Non-Primary flag is not set in non-volatile storage
   If other fabric select line indicates that it is backup . . . other fabric most likely not present
   Enter the Primary Switch Module State
   Else (otherwise, no state determination can be made until the other module is heard from)
   Send a switch status query message with the appropriate parameters
   Endif
   If a Switch Status Request is received
   Format a Switch status reply
   If the non-primary flag is set in non-volatile storage
   If software/hardware compatible with other switch fabric
   Clear non-primary indicator for this switch fabric
   Reset this switch fabric (let it come up and re-select its state)
   else
   Enter Non-Primary Switch State
   Else
   If the other switch module is compatible
   If the other switch module is active//compatible
   Enter the Backup Switch State
   Else
   If lower slot
   Enter the Primary Switch State
   Else
   Enter the Backup Switch State
   Endif
   Endif
   Else
   Enter the Non-Primary State
   Endif
   Endif
   If a Switch Status Reply is received
   If the non-primary flag is set in non-volatile storage
   If software/hardware compatible with other switch fabric
   Clear non-primary indicator for this switch fabric
   Reset this switch fabric (let it come up and re-select its state)
   Else
   Enter Non-Primary Switch State
   Else
   If the other switch module is compatible
   If the other switch module is active//compatible
   Enter the Backup Switch State
   Else
   If lower slot
   Enter the Primary Switch State
   Else
   Enter the Backup Switch State
   Endif
   Endif
   Else
   Enter the Non-Primary State
   Endif
   Endif
   If timerA expires then
   Send a Fabric Status Query for Hello and Port Status services
   Re-post timerA
   Endif (every 100 milliseconds)
   If timerB expires then
   (If still in selection state, other switch module is not responding. Transition to
   either the
   Active state or the Non-Primary state, depending on the state of the Non-Primary flag in
   non-volatile storage)
   If Non-Primary indication is set in non-volatile storage
   Enter the Non-Primary Switch State
   Else
   Enter the Active Switch State
   Endif
   Endif (every 300 milliseconds)

end (Primary Switch Module Selection State)

The primary Switch State 42 is entered from the Switch Mode Selection State 40 if it has been selected as the primary switch. The Primary Switch State can also be entered from the Backup Switch State 44 via the Transition Wait State 48 if the Primary Switch has gone inactive. A switch module in the Primary state is:

Providing the LAN interconnection

Processing the control protocols and console commands

Updating the Backup module with parameters, both volatile and non-volatile, as they change due to processing management protocols (SNMP, WEB), console commands, or chassis events (links up/down, modules inserted/removed from multicast chassis, etc.)

Querying the Hello, Port, and Connectivity Status servers

Forming a judgment of which switch module should be active (primary) using Hello and Port Status Conveying the judgment to I/O modules via switch select lines Pseudo code for this state primary switch state given below as a example and not as a implementation requirement.

Primary Switch State pseudo code

Begin

All operational code is running

When a volatile parameter changes due to a chassis event (i.e, link state, module inserted/removed) a volatile parameter change counter is incremented.

When a non-volatile parameter changes due to a management protocol (e.g., SNMP) a non-volatile parameter change counter is incremented.

Set switchMessageCount to zero

Set smcMessageCount to zero

While no error is detected

If a Warm reset message is received from SMC then

Set Switch Select Line to backup (=1)

Entry Initialization state

Endif

If a Fabric Status Response message is received then (Handle Hello Status service response)

If bit 0 of the Status serviced field is set then (Its a Hello Status service reply)

If source MAC address is the SMC's then

Increment smcMessageCount (Extract information used in error logging, not primary module judgment)

smcPrimaryModule=Primary Module field of response smcSwitchSelect=Switch Select Lines field of response Else If source MAC address is the other switch's then Increment switchMessageCount (Extract information used in error logging, not primary module judgment)

switchPrimaryModule=Primary Module field of response switchSwitchSelect=Switch Select field of response (an error could be toyed on the else case, not an expected source address)

Endif (source MAC other switch's)

Endif (source MAC is SMC's)

Endif (Its a hello status service response)

(Handle Port Status service response)

If bit 1 of the Status serviced field is set then (Its a Port Status service response)

If source MAC address is the other switch's then

Set differenceFound to False

For each Switch Port Status

Save Switch Port Status in otherSwitchPorts data structure

If back up Switch Port Status is different than your own then

Set differenceFound to True

Endif end for

If differenceFound then

AnalyzePorts(otherSwitchPorts, mySwitchPorts, bestSwitchCounter)

Else zero bestSwitchCounter

Endif

Endif (MAC address is switch, could log an error for the Else case)

Endif (Its a Switch Port Status service reply)

(Handle Connectivity Status service reply—to be added in a later version)

Endif (Fabric Status Response message is received)

If a Fabric Status Query message is received then

Start to build a response with primary state and its view of the Switch Select Lines (Now build the Switch Status field for the reply)

(Handle Hello Status Service query)

If bit 0 of the Status Service field is set then (Its a Hello Service query)

Build Null status block

If source MAC address the other switch's then

Increment switchMessageCount (Extract information used in error logging, not primary module judgment)

switchPrimaryModule=Primary Module field of the response switchSwitchSelect=Switch Select field of the response Endif Endif (its a Hello Status server query)

(Only the Primary module sends Port Status and Connectivity Status Service queries so other bits bit can be checked and log an error can be logged)

Combine all the status blocks and build the Switch Status field

Send the response with destination address of Reply Address field of the Query

Endif (Fabric Status Query message is received)

If timerA expires then

Send a Parameter Update message

Send a Fabric Status Query for Hello and Port Status services

Re-post timerA

Endif (every 100 milliseconds)

If timerB expires then

JudgeWhichSwitch(smcMessageCount, switchMessageCount, bestSwitchCounter)

Set switchMessageCount to zero

Set smcMessageCount to zero

Re-post the timerB

Endif (every 300 milliseconds)

end while (no error is detected)
If an error was detected then
Enter the errorLog state
Endif
end (Primary Switch state)
JudgeWhichSwitchoudgeMsgCount, switchMsgCount, betterPortCounter) begin
  (Analyze Hello status)
  If switchMsgCount is zero then (I haven't heard from the other switch module)
  If judgeMsgCount is zero then
  (If I can't hear from both of them I must have a broken SMLAN connection)
  If other Switch Select Line active and SMC Select Line indicates other switch module active then
(I can't communicate over SMLAN and the other module has taken over, agree, log the error, and reset)
  Set Switch Select Line to backup (=1)
  Log an error indicating other switch took over primary operation
  Restart the switch module
  Endif
  Else (we can talk to the SMC but not to the other switch)
  Ask SMC to power cycle the other switch if the SMC can't communicate with the other switch either
  Endif (judgeMsgCount is zero)
  Endif (switchMsgCount is zero)
end (JudgeWhichSwitch)

The backup switch state 44 is entered from the Switch Mode Selection 42 state when it has been selected as the Backup switch. A switch module in the Backup state is:

Obtaining parameter updates, both volatile and non-volatile, from the Primary module, as they change due to the Primary module processing the management protocols and console commands
  Allowing telnet access in read-only mode to the switch module agent
  Allowing no SNMP or WEB access to the switch module agent
  Processing incoming control protocol frames (STP, GVRP, RIP)
  Querying the Hello servers
  Forming a judgment of which switch module should be active (primary)
  Conveying the judgment to I/O modules via switch select lines Pseudo code for this state is given below as a example and not as a implementation requirement.
The backup Switch State pseudo code is as follows
Begin
  Regular operations code is running and receiving bulk volatile and non-volatile parameter transfers from the Primary switch when needed
  While no error is detected
  If a Parameter Update message is received then
  If Volatile Parameter Change counter of update message is not equal last received value then
  Update stored Volatile
  Start a TFTP bulk transfer of the volatile parameters
  Endif
  If Non-Volatile Parameter Change counter of update message is not equal last received value then
  Reset the switch module ¼ Will get non-volatile data as part of startup sequence
  Endif
  Increment switchMessageCount
  Endif
  If a Fabric Status Query message is received then
  (Handle Hello Status Service query)
  Start to build a response with primary state and its view of the Switch Select Lines
  If bit 0 of the Status Service field is set then
  Build Null status block
  If source MAC address the other switch's then
  Increment switchMessageCount
  switchPrimaryModule=Primary Module field of the response
  switchSwitchSelect=Switch Select field of the response
  If switchPrimaryModule=Backup then
  Enter the transitionWait state
  Endif
  Endif (source MAC is other switch)
  Endif (was Hello Status server query)
  (Handle Port Status Service query)
  If bit 1 of the Status service field is set then (Its a port status service query)
  If source MAC address is the other switch's then
  Start to build a Status block with
  Length (=k+(n*number of ports) where k=2 and n=2)
  Status Block type equal to 1 for Port Status
  Number of ports field equal to the number of switch module ports
  For each port of the switch module
  Fill in port status
  end for
  Endif (MAC address is switch, could log an error for the Else case)
  Endif (Its a port status service query)
  (Handle Connectivity Status Service query—covered in later version)
  Combine all the status blocks and build the Switch Status field
  Send the response with destination address of Reply Address field of the Query
  Endif (Fabric Status Query message is received)
  If a Fabric Status Response message is received then
  (Handle Hello Status service reply)
  If bit 0 of the Status serviced field is set then (Its a hello status service reply)
  If source MAC address is the SMC's then
  Increment smcMessageCount
  (Extract information used in error logging, not primary module judgment)
  smcPrimaryModule=Primary Module field of response
  smcSwitchSelect =Switch Select Lines field of response
  Else
  If source MAC address is the other switch's then
  Increment switchMessageCount
  switchPrimaryModule=Primary Module field the response
  switchSwitchSelect=Switch Select field of response If switchPrimaryModule=Backup then
Enter the transitionWait state
Endif
Endif (we could log an error on the Else case)
Endif (Its a hello status service reply)
(Only the Primary switch module sends Port Status queries so the backup will not receive responses)
(Only the primary module sends Connectivity Status queries so the backup will not receive responses)
Endif (Fabric Status Response message is received)
If timerA expires then
Send a Fabric Status Query for only Hello Status service
Re-post timerA
Endif (every 100 milliseconds)
If timerB expires then
(Analyze switch status based on Hello Status information
If switchMessageCount is zero then
If smcMessageCount is zero then (SMLAN is not working for us)
If other Switch Select Line is backup (=1) then
Enter the transitionWait state
Endif
Else (we can talk to the SMC but not the other switch)
If other Switch Select Line is active (=0) then
Ask SMC to power cycle the other switch if it can't communicate with the other switch either
Else
Enter State Transition Wait (other switch backup and not responding)
Endif
Endif
Endif (switchMessageCount is zero)
Set switchMessageCount to zero
Set smcMessageCount to zero
Re-post the timerB
Endif (every 300 milliseconds)
end while
If an error was detected then
Enter the errorLog state
Endif
end (Backup Switch State)

The transition wait state 46 provides enough time for the transmit queues of the Primary switch module 22, which may not be in lockstep with the backup switch, to drain. This is done in an attempt to avoid packet duplication. Pseudo code for this state is given below as a example and not as a implementation requirement.
Transition Wait state pseudo code is as follows:
Begin
Post a timer
While the timer has not expired.
get ready
end while
Set switch select to primary (=0)
Set timerA to transmit next Parameter Update and/or Fabric status query messages to the other switch
Set timerB to time out waiting for a message
Enter the Primary Switch state
end (Transition Wait State)

A switch module in the Non-Primary state 48 is:
Not obtaining any data updates, volatile or non-volatile, from the primary switch fabric
Processing incoming control protocol frames (STP, GVRP, RIP)
Allowing full telnet, WEB, and SNMP access to the switch module agent
Querying the Hello servers
Conveying an indication of being backup to the I/O modules via the switch select lines
Conveying an indication of module not present to the I/O modules via the backup module presence signal
Pseudo code for this state is given below as a example and not as a implementation requirement.
Non-Primary Switch State pseudo code
Begin
Regular operations code is running
No Parameter Synchronization Messages are being processed
If a Fabric Status Query message is received then
(Handle Hello Status Service query)
Start to build a response with primary state and its view of the Switch Select Lines
If bit 0 of the Status Service field is set then
Build Null status block
If source MAC address the other switch's then
Increment switchMessageCount
switchPrimaryModule=Primary Module field of the response
switchSwitchSelect=Switch Select field of the response
If module now compatible with the source switch module
Clear the Non-Primary indicator in Non-Volatile Storage
Restart the switch module
Endif
Endif (source MAC is other switch)
Endif (was Hello Status server query)
Combine all the status blocks and build the Switch Status field
Send the response with destination address of Reply Address field of the Query
Endif (Fabric Status Query message is received)
If a Fabric Status Response message is received then
(Handle Hello Status service reply)
If bit 0 of the Status serviced field is set then (Its a hello status service reply)
If source MAC address is the SMC's then
Increment smcMessageCount
(Extract information used in error logging, not primary module judgment)
smcPrimaryModule=Primary Module field of response
smcSwitchSelect=Switch Select Lines field of response
Else
If source MAC address is the other switch's then
Increment switchMessageCount
switchPrimaryModule=Primary Module field the response
switchSwitchSelect=Switch Select field of response
Endif
Endif
Endif (we could log an error on the Else case)

Endif (Its a hello status service reply)
Endif (Fabric Status Response message is received)
If timerA expires then
    Send a Fabric Status Query for only Hello Status service
    Re-post timerA
Endif (every 100 milliseconds)
end (Non-Primary Switch State)

With the RSS 20 arrangement of FIG. 2A and 2B, both the Active and Backup switch modules receive traffic from the I/O modules. Accordingly, forwarding data base information need not be exchanged. Management and control frames destined for the logical device will be either sent to only the primary switch or both depending on the interconnection method. It is a more robust design to have only the primary switch process the management and control frames and update the backup switch with the state changes. This reduces the chance of both the primary and backup switches performing a bug check at the same time, leaving no switch ready to forward traffic. Each switch must maintain a unified view of the logical switch and port parameters to provide a smooth switch over reconfiguration.

It is important that source MAC addresses learned by the RSS 20 are consistent in both the primary and backup switches. If the traffic is sent to both the primary and backup switches then source address learning can be shared at a slower rate than when this interconnection method is not used. This sharing of state information requires a communication path 25 between switches in a RSS. This communication path 25 may be a dedicated resource.

LOGICAL SWITCH LOAD SHARING

Figure 5:
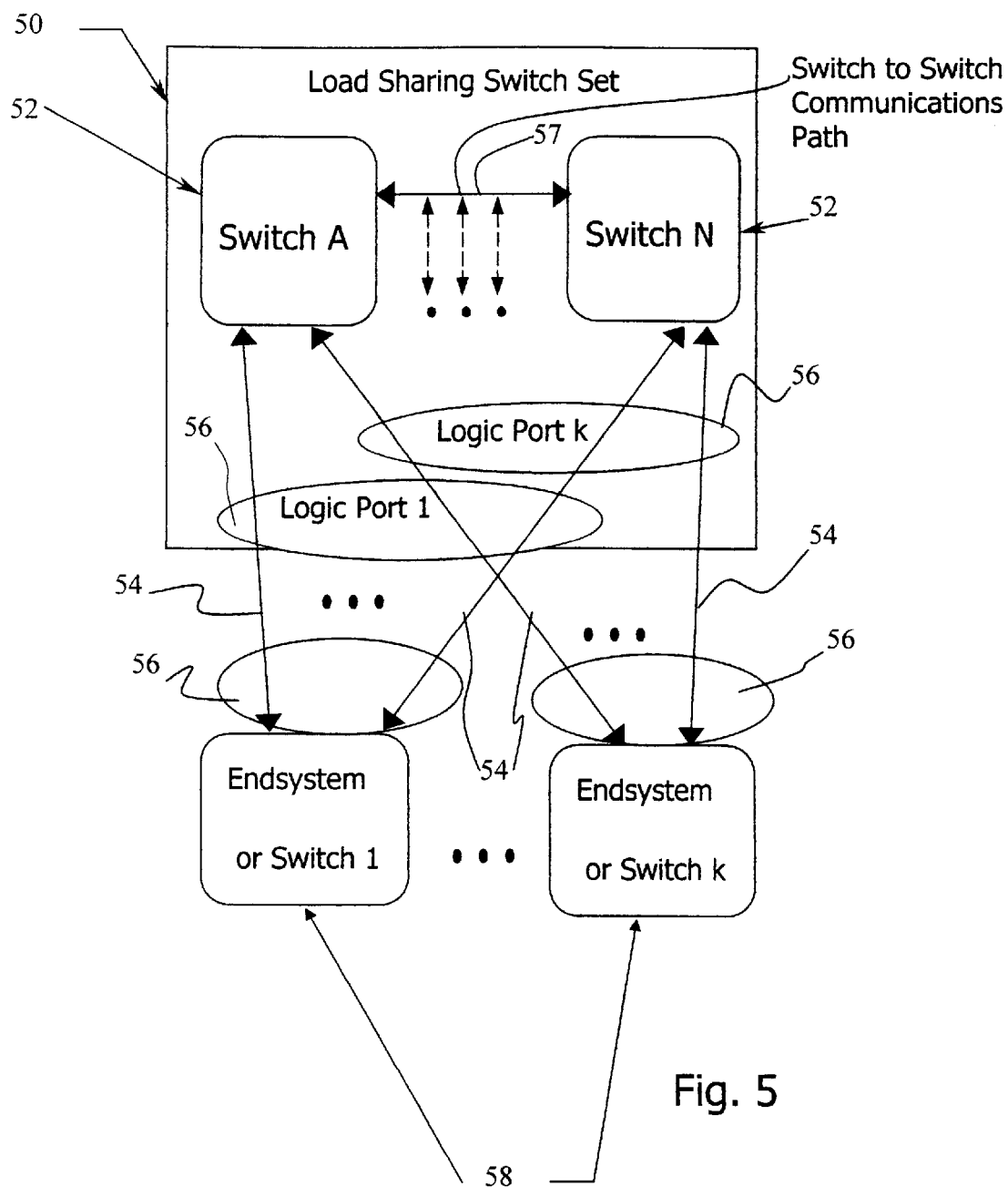
FIG. 5 is a view similar to FIG. 1 for explaining the redundant switch set implemented as a load sharing set.

A Load Sharing Redundant Switch Set (LSSS) 50 is shown in FIG. 5. The LSSS is again formed of two or more switches that act as a single logical switch with specific connection rules. Unlike the RSS 20 described above, the maximum throughput of the LSSS increases with each additional switch 52.

A Load Sharing Switch Set 50 can only interconnect with the other devices via trunked links that contain at least one physical connection 54 to each switch 52 (A through N) in the LSSS 50. This prevents any single link attachments to the LSSS 50. This also implies that if a link is lost, leaving no remaining links to that switch, then LSSS 50 can either chose to drop service to that station or stop using that switch for load sharing for all connected devices. Effectively removing that switch from LSSS 50.

The LSSS 50 implements a single logical device 56 which is comprised of two or more separate switches 52. This model requires that state or parameter changes, acquired from the traffic streams a switch receives, be shared between the other switches. States and parameter changes can occur from learning MAC source addresses and processing management and control frames.

Management and control frames destined for the logical device 56 will be directed to one of the switches 52 by a hashing algorithm of an attached device. Each switch 52 in the LSSS 50 implements one or more of the physical links, within a trunked group, for each of the ports of the logical device. Each switch 52 must have a unified view of the logical switch and port parameters to properly forward traffic and to transmit management and control frames.

It is important that source MAC addresses are learnt quickly where they are needed. If the algorithm, used to direct traffic between physical links within a trunk, has a property which guarantees the path from one station to another will be the same (but in the opposite direction) as the return path, then source address learning can be shared at a slower rate than when this property is not guaranteed. This sharing of state information requires a communication path 53 between switches 52 in a LSSS 50. This communication path 53 may be a dedicated resource.

Figure 6:
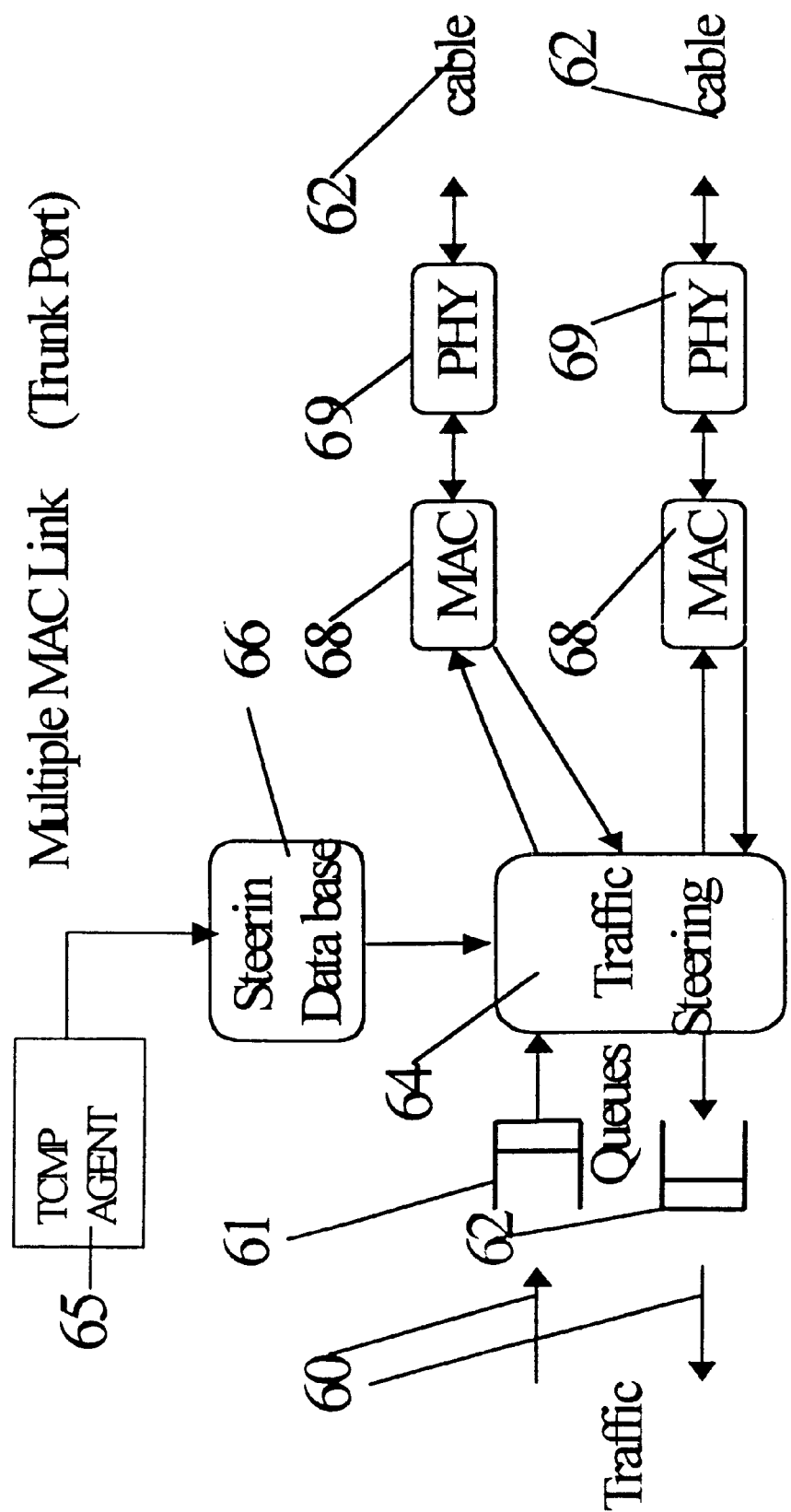
FIG. 6 is a state diagram showing the substates of the switches in a load sharing switch state.

FIG. 6 is an example of a traffic steering system which may be used according to the invention. FIG. 6 illustrates the traffic flow 60 through a multiple link trunked port such as multiple link trunked port 56 based on transmit queue 61, receive queue 62, traffic steering means 64, steering data base 66, media access controllers (MACs) 68, physical layers 69 and connected cable (link 54). The trunked port 56 acts as a single port, but utilizes multiple physical links 54. The traffic steering means is the logic that knows which MAC 68 to use when transmitting a packet. The traffic steering means 64 dequeues transmit packets, examines the packet, consults the steering data base 66 and transfers the packet to the appropriate MAC 68. The steering data base 66 is constructed by information obtained by the reachability protocol or trunk configuration management protocol (TCMP).

The switches in a LSSS follow the same high level state diagram, illustrated in FIG. 3, as the RSS follows. FIG. 6 illustrates the substates of the operational states. Initialization operations include, verifying the NV data is valid for this chassis and synchronization of the parameters between the modules. The Switch Mode Selection state 70 is entered after initialization is complete. This state determines whether the primary state 72 or the non-primary state 78 should be entered. If the switches are all compatible and healthy they all will run in the primary mode state 72. If a switch is incompatible with the other switch (or switches) (both in the example) in the LSSS it will be in the non-primary state 78. Configuration incompatibility maybe due to either hardware of software version. The non-primary state is saved in non-volatile storage until it is either cleared manually, or until the incompatible condition no longer exists.

In the Non-Primary state, a module monitors the update messages, waiting to determine whether or not the incompatibility has been resolved. No data synchronization is maintained between the primary and the non-primary switch module.

Switch Module Selection state pseudo code
Begin
    Set timerA (100 milliseconds ) to transmit next Update
        message to the other switch
    Set timerB (300 milliseconds) to time out waiting for a
        message
    Send a Update message with the appropriate parameters
    If a Update is received
        If the non-primary flag is set in non-volatile storage
            If software/hardware compatible with other switch fabric
                Clear non-primary indicator for this switch fabric
                Reset this switch fabric (let it come up and re-select its
                    state)
            Else
                Enter Non-Primary Switch State
            Endif (software/hardware compatible with other switch
                fabric)
        Else
            If the other switch module is compatible
                Enter the Primary Switch State Else
Enter the Non-Primary State
Endif (other switch module is compatible)
Endif (update message is received)
If timerA expires then
Send a Update message
Re-post timerA
Endif (every 100 milliseconds)
If timerB expires then
(If still in selection state, other switch module is not responding. Transition to either the
Primary state or the Non-Primary state, depending on the state of the Non-Primary flag in
   non-volatile storage)
   If Non-Primary indication is set in non-volatile storage
   Enter the Non-Primary Switch State
   Else
   Enter the Primary Switch State
   Endif
   Endif (every 300 milliseconds)
end (Switch Module Selection State)

The primary Switch State 72 is entered from the Switch Mode Selection State 70 if it is compatible with the other switch.

A switch module in the Primary state is:

Providing the LAN interconnection

Processing the control protocols and console commands

Updating the other switch (or switches) with parameters, both volatile and nonvolatile, as they change due to processing management protocols (SNMP, WEB), console commands, or chassis events (links up/down, modules inserted/removed, etc.)

Pseudo code for this state is given below as a example and not as a implementation requirement.
Primary Switch State pseudo code
Begin
   All operational code is running
   When a volatile parameter changes due to a chassis event (i.e, link state, module inserted/removed) a volatile parameter change counter is incremented.
   When a non-volatile parameter changes due to a management protocol (e.g., SNMP) a non-volatile parameter change counter is incremented.
   While no error is detected
   If a Warm reset message is received from SMC then
   Enter Initialization state
   Endif
   If a Update message is received then
   If Volatile Parameter Change counter of update message is not equal last received value then
   Update stored Volatile Change counter
   Start a TFTP bulk transfer of the volatile and/or non-volatile parameters
   Endif (volatile parameter change counter has changed)
   If Non-Volatile Parameter Change counter of update message is not equal last received value then
   Update stored Non-Volatile Change counter
   Start a TFTP bulk transfer of the non-volatile parameters
   Endif
   If timerA expires then
   Send a Update message
   Re-post timerA
   Endif (every 100 milliseconds)
   end while (no error is detected)
   If an error was detected then
   Enter the errorLog state
   Endif
end (Primary Switch state)

A switch module in the Non-Primary state 78 is entered from the switch mode 70 if it is incompatible with the other switch:

Not obtaining any data updates, volatile or non-volatile, from the primary switch fabric Examining the other switch hardware and software revisions to determine if it is still incompatible Accepting software upgrades Pseudo code for this state is given below as a example and not as a implementation requirement.
Non-Primary Switch State pseudo code
Begin
   Regular operations code is running
   If a Update message is received then
   If module is now compatible with the other switch
   Clear the Non-Primary indicator in Non-Volatile Storage
   Restart the switch module
   Endif (now compatible with the other switch)
   Endif (Update message is received)
   If timerA expires then
   Send a Update message to the other switch
   Re-post timerA
   Endif (every 100 milliseconds)
end (Non-Primary Switch State)

While specific embodiments of the invention have been shown and described in detail to illustrate the application of the principles of the invention, it will be understood that the invention may be embodied otherwise without departing from such principles.

What is claimed is:

1. A load sharing switch set, comprising:

a plurality of switches grouped together to form a single packet forwarding device functioning as a load sharing switch set, said plurality of switches forming a single logical device;

a plurality of edge devices with media access controller (MAC) devices, each of said edge device including a trunk configuration management protocol (TCMP) agent;

trunk link means for connecting each of said edge devices to each switch of said switch mesh by a separate link;

hello transmit means associated with each MAC device for transmitting a hello signal to MAC devices of other said edge devices, said Hello signal including an edge device ID identifying a respective edge device of said MAC device;

storage associated with each said MAC device for recording edge device ID's of said Hello signals received from other said edge devices;

said TCMP agent of said respective edge device forming a trunk list for each other edge device, each said trunk list including all MAC devices of a respective edge device which received said Hello signals from one of said other edge devices;

each said TCMP agent dividing traffic received for one of said other edge devices among said MAC devices of said trunk list for said one of said other edge devices, said dividing being according to a trunking convention.

2. A load sharing switch set according to claim 1, further comprising: state/parameter change sharing means for sharing state/parameter changes received at one switch of said plurality of switches with other switches of said plurality of switches.

3. The load sharing switch set according to claim 2, wherein said state/parameter change sharing means comprises a communication path connected to each of said plurality of switches.

4. The load sharing switch set according to claim 1, further comprising MAC source address sharing means for receiving and storing MAC source addresses at one said plurality of switches and sharing said received MAC source addresses with others of said plurality of switches.

5. The load sharing switch set according to claim 4, wherein said MAC source address sharing means comprises a switch-to-switch communication path, connected to each of said plurality of switches.

6. A load sharing switch set arrangement according to claim 1, wherein management and control frames destined for said single logical device are directed to one of said switches.

7. A method of trunking a plurality of mesh switches, the method comprising the steps of:

providing a plurality of switches grouped together to form a single packet forwarding device functioning as a load sharing switch set, said plurality of switches forming a single logical device;

a plurality of edge devices, each of said edge devices being connected to a logical port of said single logical device, including a connection of said mesh switches by a separate link and MAC device to each edge device, each said edge device including a TCMP agent;

each said MAC device transmitting an Hello signal to MAC devices of other said edge devices, said Hello signal including an edge device ID identifying a respective edge device of said MAC device;

each said MAC device recording edge device ID's of said Hello signals received from other said edge devices;

said TCMP agent of said respective edge device forming a trunk list for each other edge device, each said trunk list including all MAC devices of a respective edge device which received said Hello signals from one of said other edge devices;

each said TCMP agent dividing traffic received for one of said other edge devices among said MAC devices of said trunk list for said one of said other edge devices, said dividing being according to a trunking convention.

* * * * *